(12) United States Patent  
Chen

(10) Patent No.: US 8,744,854 B1  
(45) Date of Patent: Jun. 3, 2014

(54) SYSTEM AND METHOD FOR VOICE TRANSFORMATION

(71) Applicant: Chengjun Julian Chen, White Plains, NY (US)

(72) Inventor: Chengjun Julian Chen, White Plains, NY (US)

( * ) Notice: Subject to any disclaimer, the term of this patent is extended or adjusted under 35 U.S.C. 154(b) by 0 days.

(21) Appl. No.: 13/625,317

(22) Filed: Sep. 24, 2012

(51) Int. Cl.  
*G10L 15/04* (2013.01)

(52) U.S. Cl.  
CPC ................................. *G10L 15/04* (2013.01)  
USPC ...................................................... 704/269

(58) Field of Classification Search  
CPC ..................................................... G10L 15/04  
USPC ...................................................... 704/266  
See application file for complete search history.

(56) References Cited

U.S. PATENT DOCUMENTS

| | | | |
|---|---|---|---|
| 5,327,498 A | 7/1994 | Hamon | |
| 5,524,172 A | 6/1996 | Hamon | |
| 5,611,002 A | 3/1997 | Vogten | |
| 5,617,507 A | 4/1997 | Lee | |
| 5,751,905 A | 5/1998 | Chen | |
| 5,970,440 A | 10/1999 | Veldhuis | |
| 6,125,344 A | 9/2000 | Kang | |
| 6,510,410 B1 | 1/2003 | Chen | |
| 8,121,834 B2 * | 2/2012 | Rosec et al. | 704/224 |
| 2007/0011009 A1 | 1/2007 | Nurminen | |

OTHER PUBLICATIONS

Stylianou, Voice Transformation, in Springer Handbook of Speech Processing, p. 489, Springer Verlag, Berlin, Germany, 2007.  
Schroeter, Basic Principles of Speech Synthesis, in Springer Handbook of Speech Processing, p. 413, Springer Verlag, Berlin, Germany, 2007.  
Robiner & Juang, Historical Perspective of ASR/NLU, in Springer Handbook of Speech Processing, p. 521, Springer Verlag, Berlin, Germany, 2007.  
Moulines & Charpentier, Pitch Synchronous Waveform Processing for Text-to-Speech, Speech Communications, vol. 9, p. 453, (1990).

* cited by examiner

*Primary Examiner* — Susan McFadden

(57) ABSTRACT

The present invention is a method and system to convert speech signal into a parametric representation in terms of timbre vectors, and to recover the speech signal thereof. The speech signal is first segmented into non-overlapping frames using the glottal closure instant information, each frame is converted into an amplitude spectrum using a Fourier analyzer, and then using Laguerre functions to generate a set of coefficients which constitute a timbre vector. A sequence of timbre vectors can be subject to a variety of manipulations. The new timbre vectors are converted back into voice signals by first transforming into amplitude spectra using Laguerre functions, then generating phase spectra from the amplitude spectra using Kramers-Knonig relations. A Fourier transformer converts the amplitude spectra and phase spectra into elementary waveforms, then superposed to become the output voice. The method and system can be used for voice transformation, speech synthesis, and automatic speech recognition.

20 Claims, 8 Drawing Sheets

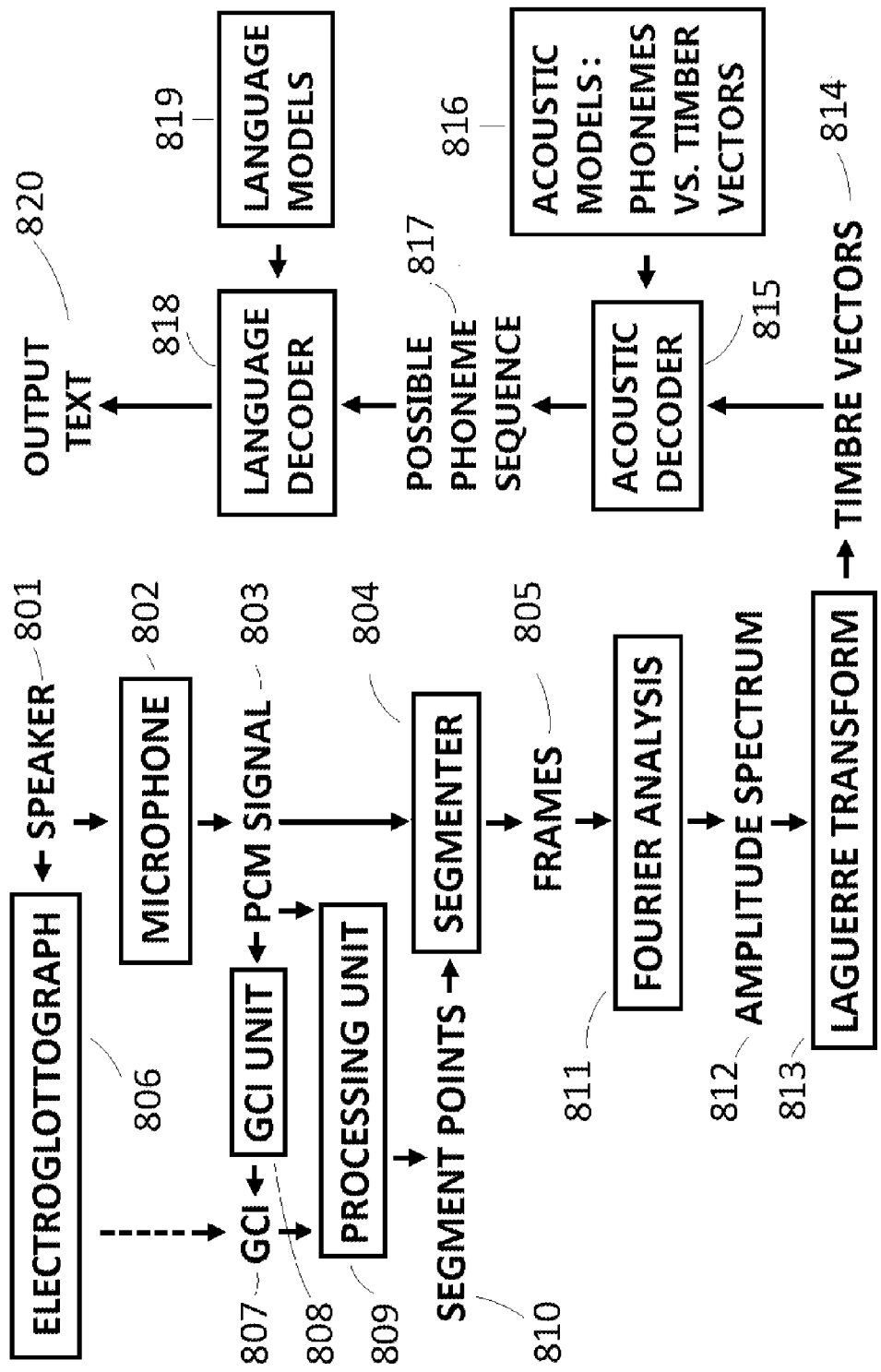

SYSTEM AND METHOD FOR VOICE TRANSFORMATION

FIELD OF THE INVENTION

The present invention generally relates to voice transformation, in particular to voice transformation using orthogonal functions, and its applications in speech synthesis and automatic speech recognition.

BACKGROUND OF THE INVENTION

Voice transformation involves parameterization of a speech signal into a mathematical format which can be extensively manipulated such that the properties of the original speech, for example, pitch, speed, relative length of phones, prosody, and speaker identity, can be changed, but still sound natural. A straightforward application of voice transformation is singing synthesis. If the new parametric representation is successfully demonstrated to work well in voice transformation, it can be used for speech synthesis and automatic speech recognition.

Speech synthesis, or text-to-speech (TTS), involves the use of a computer-based system to convert a written document into audible speech. A good TTS system should generate natural, or human-like, and highly intelligible speech. In the early years, the rule-based TTS systems, or the formant synthesizers, were used. These systems generate intelligible speech, but the speech sounds robotic, and unnatural.

Currently, a great majority of commercial TTS systems are concatenative TTS system using the unit-selection method. According to this approach, a very large body of speech is recorded and stored. During the process of synthesis, the input text is first analyzed and the required prosodic features are predicted. Then, appropriate units are selected from a huge speech database, and stitched together. There are always mismatches at the border of consecutive segments from different origins. And there are always cases of required segments that do not exist in the speech database. Therefore, modifications of the recorder speech segments are necessary. Currently, the most popular method of speech modification is the time-domain pitch-synchronized overlap-add method (TD-PSOLA), LPC (linear prediction coefficients), mel-cepstral coefficients and sinusoidal representations. However, using those methods, the quality of voice is severely degraded. To improve the quality of speech synthesis and to allow for the use of a small database, voice transformation is the key. (See Part D of Springer Handbook of Speech Processing, Springer Verlag 2008).

Automatic speech recognition (ASR) is the inverse process of speech synthesis. The first step, acoustic processing, reduces the speech signal into a parametric representation. Then, typically using HMM (Hidden Markov Model), with a statistic language model, the most likely text is thus produced. The state-of-the-art parametric representation for speech is LPC (linear prediction coefficients) and mel-cepstral coefficients. Obviously, the accuracy of speech parameterization affects the overall accuracy. (See Part E of Springer Handbook of Speech Processing, Springer Verlag 2008).

SUMMARY OF THE INVENTION

The present invention is directed to a novel mathematical representation of the human voice as a timbre vector, together with a method of parameterizing speech into a timbre vector, and a method to recover human voice from a series of timbre vectors with variations. According to an exemplary embodiment of the invention, a speech signal is first segmented into non-overlapping frames using the glottal closure moment information. Using Fourier analysis, the speech signal in each frame is converted into amplitude spectrum, then Laguerre functions (based on a set of orthogonal polynomials) are used to convert the amplitude spectrum into a unit vector characteristic to the instantaneous timbre. A timbre vector is formed along with voicedness index, frame duration, and an intensity parameter. Because of the accuracy of the system and method and the complete separation of prosody and timbre, a variety of voice transformation operations can be applied, and the output voice is natural. A straightforward application of voice transformation is singing synthesis.

One difference of the current invention from all previous methods is that the frames, or processing units, are non-overlapping, and do not require a window function. All previous parameterization methods, including linear prediction confidents, sinusoidal models, mel-cepstral coefficients and time-domain pitch synchronized overlap add methods rely on overlapping frames requiring a window function (such as Hamming window, Hann window, cosine window, triangular window, Gaussian window, etc.) and a shift time which is smaller than the duration of the frame, which makes an overlap.

An important application of the inventive parametric representation is speech synthesis. Using the parametric representation in terms of timbre vectors, the speech segments can be modified to the prosodic requirements and regenerate an output speech with high quality. Furthermore, because of the complete separation of timbre and prosody data, the synthesized speech can have different speaker identity (baby, child, male, female, giant, etc), base pitch (up to three octaves), speed (up to 10 times), and various prosodic variations (calm, emotional, up to shouting). The timbre vector method disclosed in the present invention can be used to build high-quality speech synthesis systems using a compact speech database.

Another important application of the inventive parametric representation of speech signal is to serve as the acoustic signal format to improve the accuracy of automatic speech recognition. The timbre vector method disclosed in the present invention can greatly improve the accuracy of automatic speech recognition.

BRIEF DESCRIPTION OF DRAWINGS

FIG. 8 is a block diagram of an automatic speech recognition system using timbre vectors according to an exemplary embodiment of the present invention.

DETAILED DESCRIPTION OF THE INVENTION

Various exemplary embodiments of the present invention are implemented on a computer system including one or more processors and one or more memory units. In this regard, according to exemplary embodiments, steps of the various methods described herein are performed on one or more computer processors according to instructions encoded on a computer-readable medium.

Figure 1:
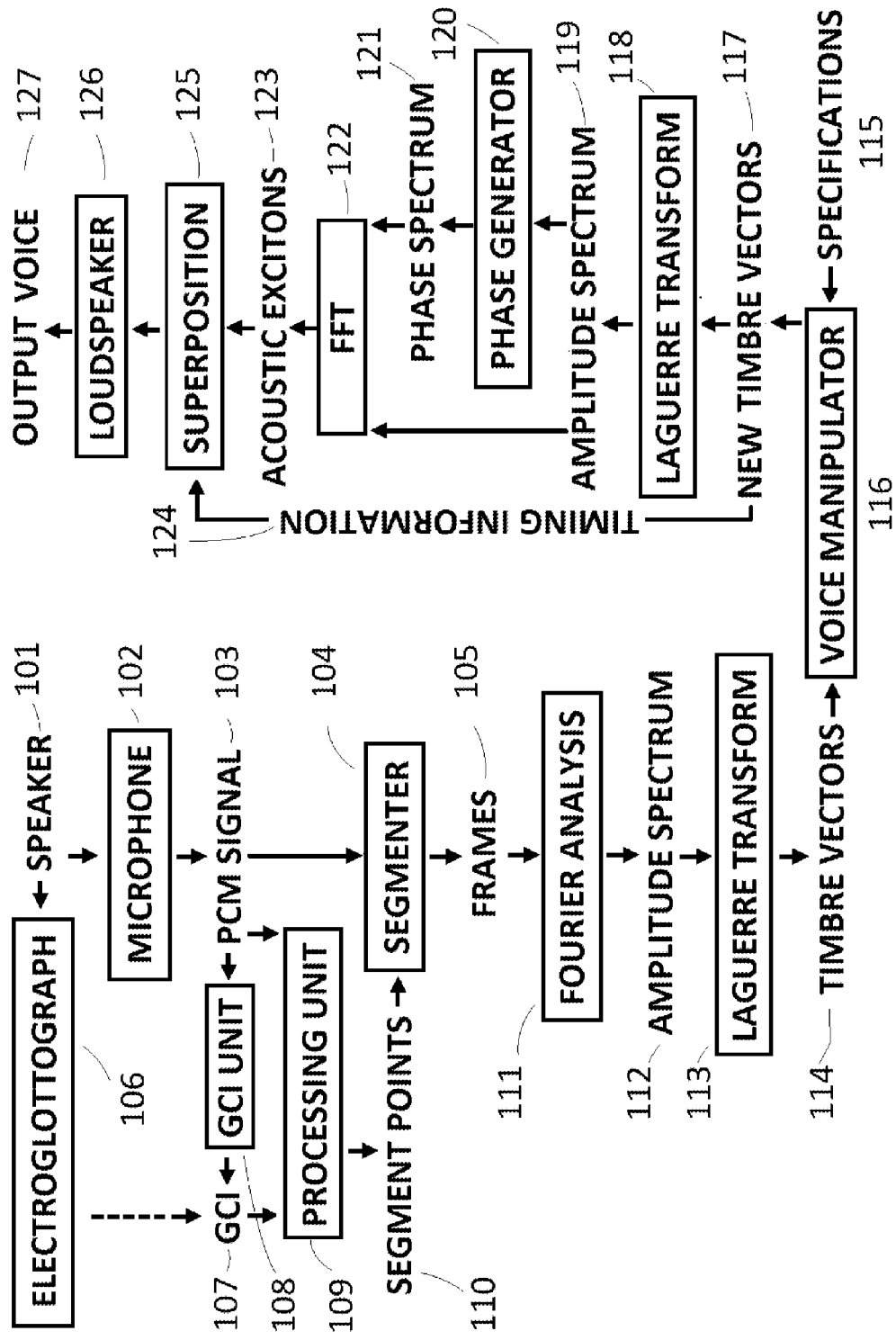
FIG. 1 is a block diagram of a voice transformation systems using timbre vectors according to an exemplary embodiment of the present invention.

FIG. 1 is a block diagram of the voice transformation system according to an exemplary embodiment of the present invention. The source is the voice from a speaker 101. Through a microphone 102, the voice is converted into electrical signal, and recorded in the computer as PCM (Pulse Code Modulation) signal 103. The PCM signal 103 is then segmented by segmenter 104 into frames 105, according to segment points 110. There are two methods to generate the segment points. The first one is to use an electroglottograph (EGG) 106 to detect the glottal closure instants (GCI) 107 directly (See FIG. 2). The second one is to use a glottal closure instants detection unit 108 to generate GCI from the voice waveform. The glottal closure instants (GCI) 107 and the voice signal (PCM) 103 are sent to a processing unit 109, to generate a complete set of segment points 110. The details of this process is shown in FIG. 3.

The voice signal in each frame 105 proceeds through a Fourier analysis unit 111 to generate amplitude spectrum 112. The amplitude spectrum 112 proceeds through an orthogonal transform unit 113 to generate timbre vectors 114. In exemplary embodiments, Laguerre functions are the most appropriate mathematical functions for converting the amplitude spectrum into a compact and convenient form (see FIG. 4). Data structure of a timbre vector is shown in FIG. 5.

After the PCM signal 103 is converted into timbre vectors 114, a number of voice manipulations can be made according to specifications 115 by voice manipulator 116, so as to generate new timbre vectors 117, then the voice can be regenerated using the new timbre vectors 117. In detail, the steps are as follows: Laguerre transform 118 is used to regenerate amplitude spectrum 119; the phase generator 120 (based on Kramers-Kronig relations) is used to generate phase spectrum 121; FFT (Fast Fourier Transform) 122 is used to generate an elementary acoustic wave 123, from the amplitude spectrum and phase spectrum; then those elementary acoustic waves 123 are superposed according to the timing information 124 in the new timbre vectors, each one is delayed by the time of frame duration 125 of the previous frame. The output wave in electric form then drives a loudspeaker 126 to produce an output voice 127.

Figure 2:
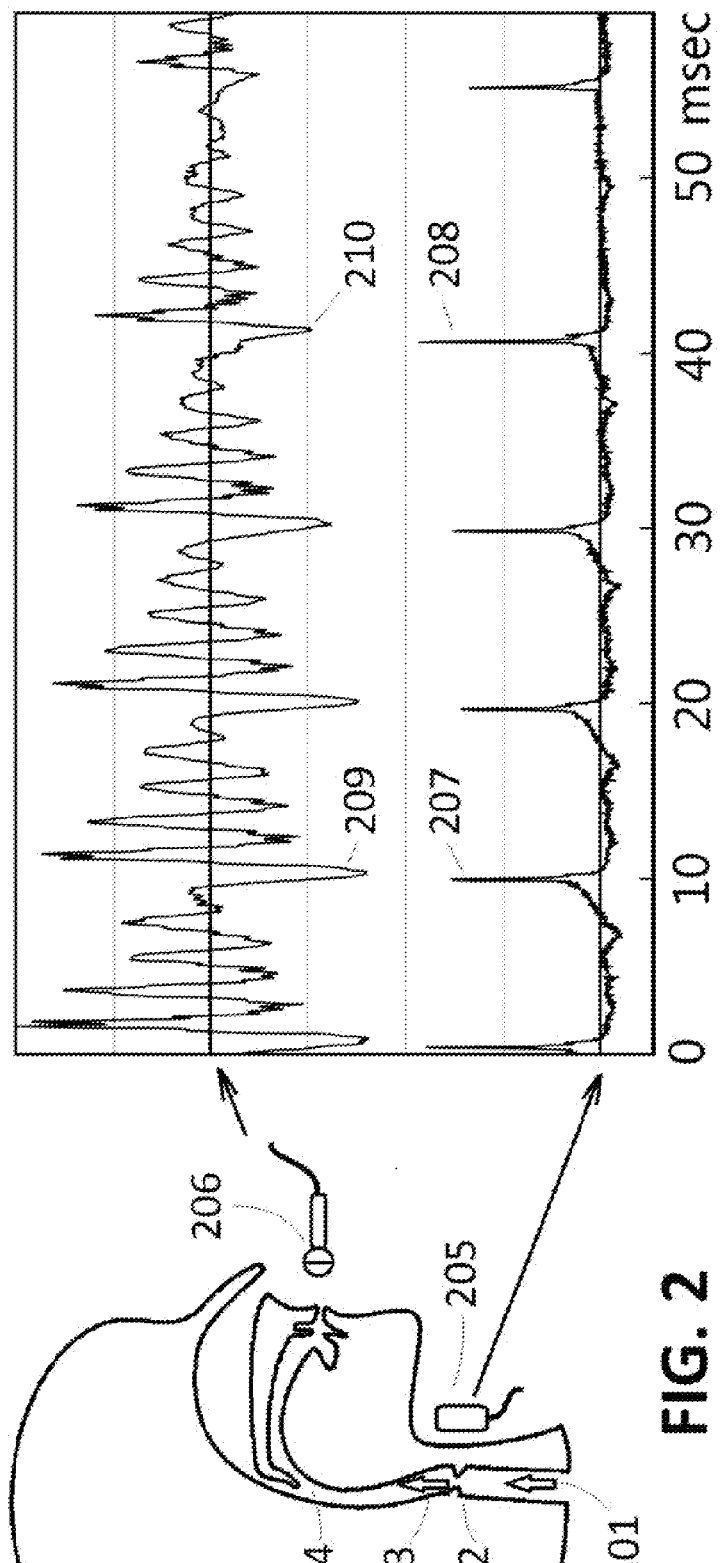
FIG. 2 is an explanation of the basic concept of parameterization according to an exemplary embodiment of the present invention.
Figure 3:
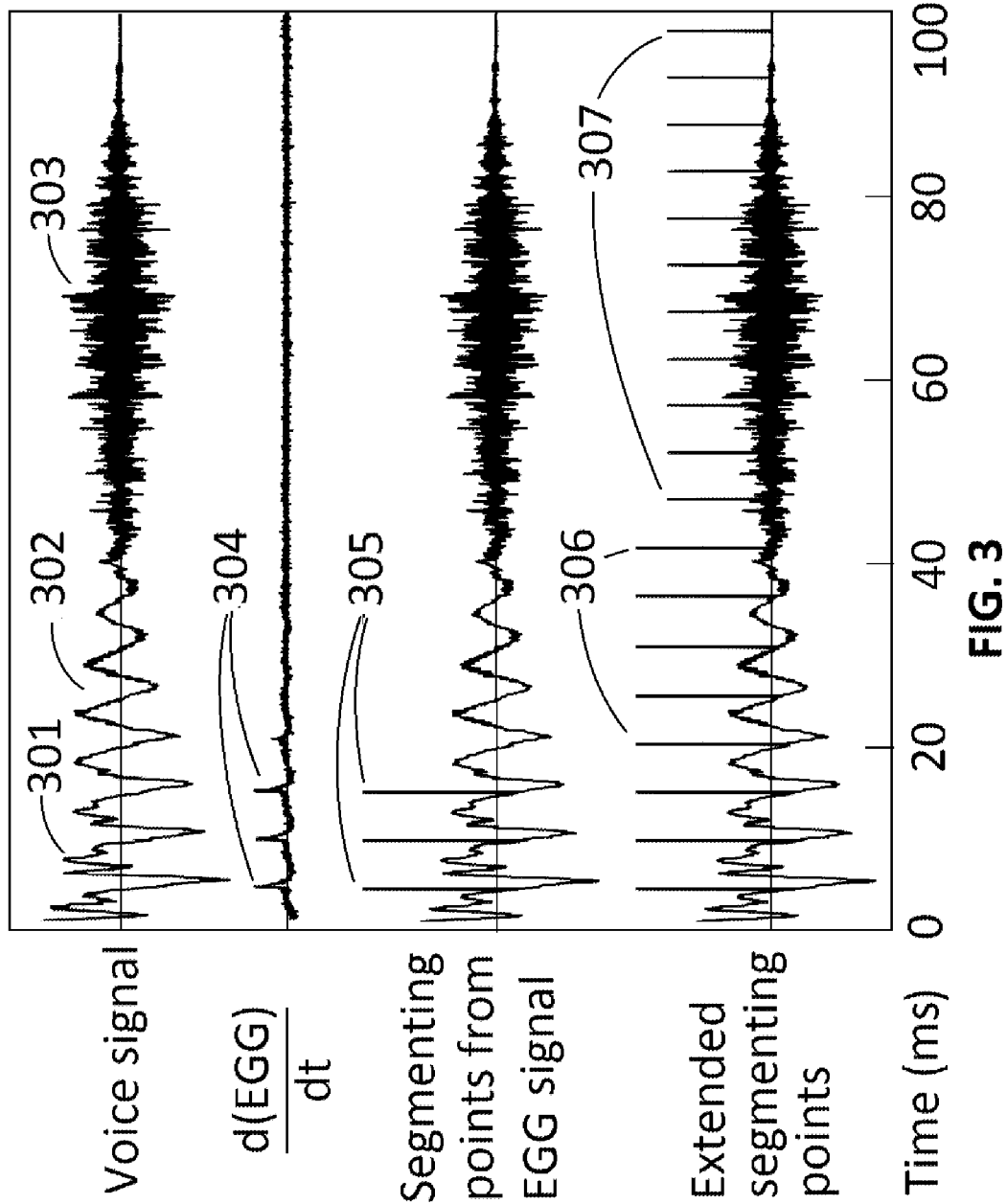
FIG. 3 is the process of segmenting the PCM data according to an exemplary embodiment of the present invention.

FIG. 2 shows the process of speech generation, particularly the generation of voiced sections, and the properties of the PCM and EGG signals. Air flow 201 comes from the lungs to the opening between the two vocal cords, or glottis, 202. If the glottis is constantly open, there is a constant air flow 203, but no voice signal is generated. At the instant the glottis closes, or a glottal closure occurs, which is always very rapid due to the Bernoulli effect, the inertia of the moving air in the vocal track 204 generates a d'Alembert wave front, then excites an acoustic resonance. The actions of the glottis is monitored by the signals from a electroglottograph (EGG) 205. When there is a glottal closure, the instrument generates a sharp peak in the derivative of the EGG signal, as shown as 207 in FIG. 2. A microphone 206 is placed near the mouth to generate a signal, typically a Pulse Code Modulation signal, or PCM, as shown in 209 in FIG. 2. If the glottis remains closed after a closure, as shown as 208, then the acoustic excitation sustains, as shown as 210.

FIG. 3 shows the details of processing unit 109 to generate the segmentation points. The input data is the PCM signal 301-303 and EGG signal 304, produced by the source speaker 101. When there are clear peaks in the EGG signal, such as 304, corresponding to PCM signal 301, those peaks are selected as the segmentation points 305. For some quasi-periodic segments of the voice 302, there is no clear EGG peaks. The segmentation points are generated by comparing the waveform 302 with the neighboring ones 301, and if the waveform 302 is still periodic, then segmentation points 306 are generated at the same intervals as the segmentation points 305. If the signal is no longer periodic, such as 303, the PCM is segmented according to points 307 into frames with an equal interval, here 5 msec. Therefore, the entire PCM signal is segmented into frames.

The values of the voice signal at two adjacent closure moments may not match. The following is an algorithm that may be used to match the ends. Let the number of sampling points between two adjacent glottal closures be N, and the original voice signal be $x_0(n)$. The smoothed signal $x(n)$ in a small interval $0<n<M$ is defined as $$x(N-n) = x_0(N-n)\frac{n}{M} + x_0(-n)\frac{M-n}{M}.$$

Where M is about N/10. Otherwise $x(n)=x_0(n)$. Direct inspection shows that the ends of the waveform are matched, and it is smooth. Therefore, no window functions are required. The waveform in a frame is processed by Fourier analysis to generate an amplitude spectrum. The amplitude spectrum is further processed by a Laguerre transform unit to generate timbre vectors as follows.

Laguerre functions are defined as $$\Phi_n(x) = \sqrt{\frac{n!}{(n+k)!}}\, e^{-x/2} x^{k/2} L_n^{(k)}(x),$$

where k is an integer, typically k=2 or k=4; and the associated Laguerre polynomials are $$L_n^{(k)}(x) = \frac{e^x x^{-k}}{n!}\, \frac{d^n}{dx^n}(e^{-x} x^{n+k}).$$

The amplitude spectrum $A(\omega)$ is expended into Laguerre functions $$A(\omega) = \sum_{n=0}^{N} C_n \Phi_n(\kappa\omega),$$

where the coefficients are calculated by $$C_n = \int_0^\infty \kappa A(\omega) \Phi_n(\kappa\omega)\, d\omega,$$

and κ is a scaling factor to maximize accuracy. The norm of the vector C is the intensity parameter I, $$I = \sqrt{\sum_{n=0}^{N} C_n^2},$$

and the normalized Laguerre coefficients are defined as $$c_n = C_n/I.$$

To recover phase spectrum $\phi(\omega)$ from amplitude spectrum $A(\omega)$, Kramers-Kronig relations are used, $$\varphi(\omega) = -\frac{1}{\pi} \lim_{\varepsilon \to 0} \left[ \int_{-\infty}^{\omega-\varepsilon} \frac{\ln A(\omega')}{\omega' - \omega} d\omega' + \int_{\omega+\varepsilon}^{\infty} \frac{\ln A(\omega')}{\omega' - \omega} d\omega' \right]$$

The output wave for a frame, the acoustic exciton, can be calculated from the amplitude spectrum $A(\omega)$ and the phase spectrum $\phi(\omega)$, $$x(t) = \int_0^{\infty} A(\omega) \cos(\omega t - \varphi(\omega)) d\omega.$$

Figure 4:
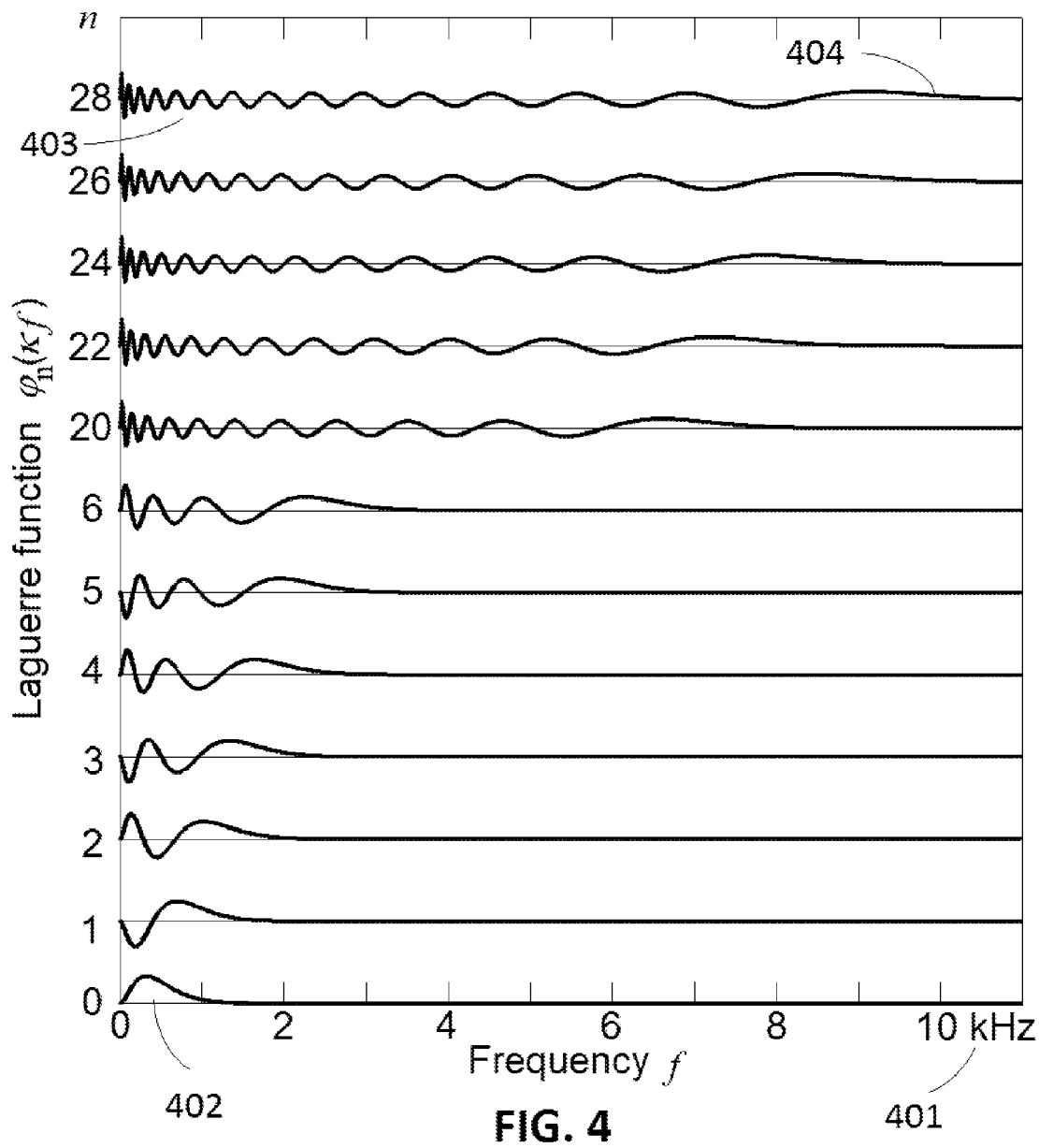
FIG. 4 is a plot of the Laguerre functions according to an exemplary embodiment of the present invention.
Figure 5:
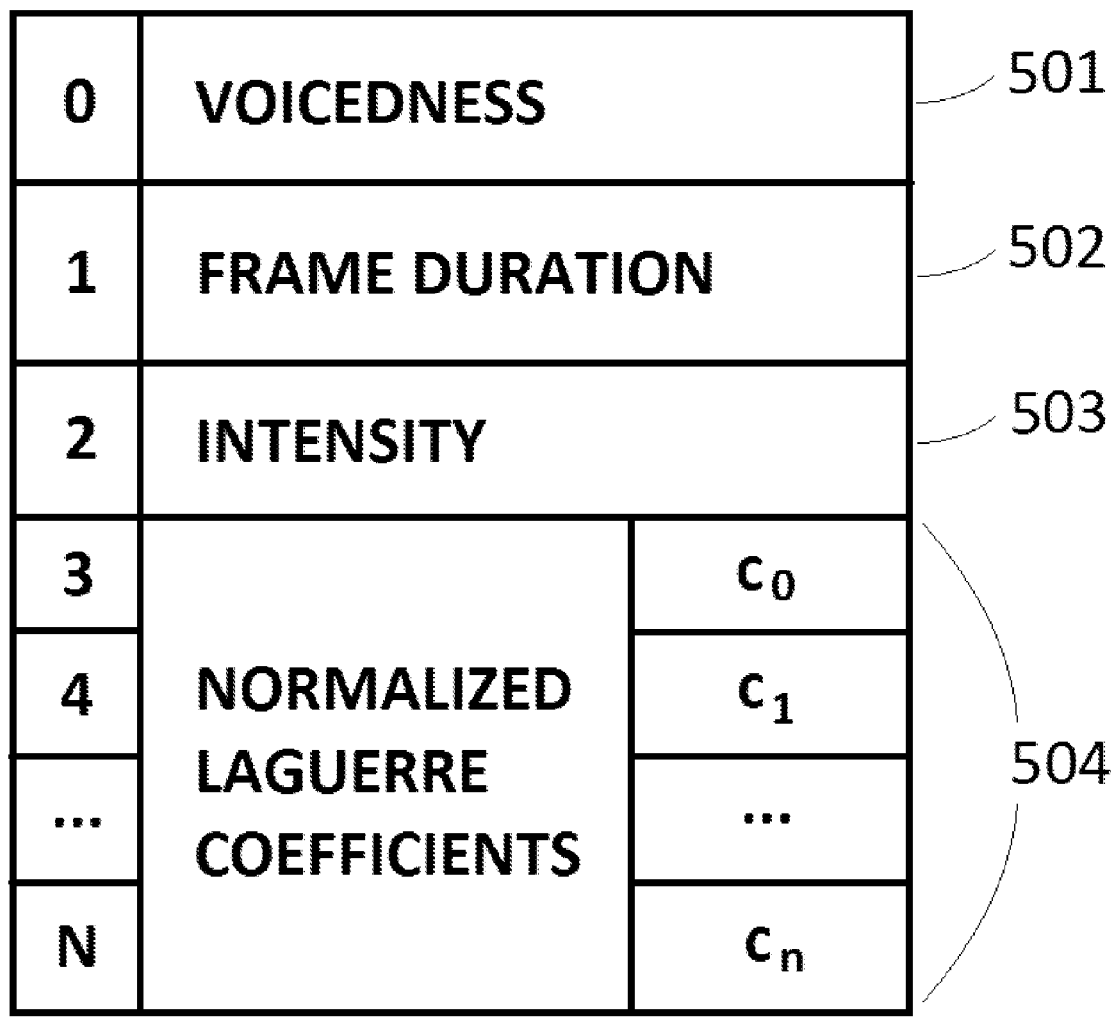
FIG. 5 is the data structure of a timbre vector according to an exemplary embodiment of the present invention.

FIG. 4 shows the Laguerre function. After proper scaling, twenty-nine Laguerre functions are used on the frequency scale 401 of 0 to 11 kHz. The first Laguerre function 402 actually probes the first formant. For higher order Laguerre functions, such as the Laguerre function 403, the resolution in the low-frequency range is successively improved; and extended to the high-frequency range 404. Because of the accuracy scaling, it makes an accurate but concise representation of the spectrum.

FIG. 5 shows the data structure of a timbre vector including the voicedness index (V) 501, the frame duration (T) 502, the intensity parameter (I) 503, and the normalized Laguerre coefficients 504.

There are many possible voice transformation manipulations, including, for example, the following:

Timbre interpolation. The unit vector of Laguerre coefficients varies slowly with frames. It can be interpolated for reduced number of frames or extended number of frames for any section of voice to produce natural sounding speech of arbitrary temporal variations. For example, the speech can be made very fast but still recognizable by a blind person.

Timbre fusing. By connecting two sets of timbre vectors of two different phonemes and smear-averaging over the juncture, a natural-sounding transition is generated. Phoneme assimilation may be automatically produced. By connecting a syllable ended with [g] with a syllable started with [n], after fusing, the sound [n] is automatically assimilated into [ng].

Figure 6:
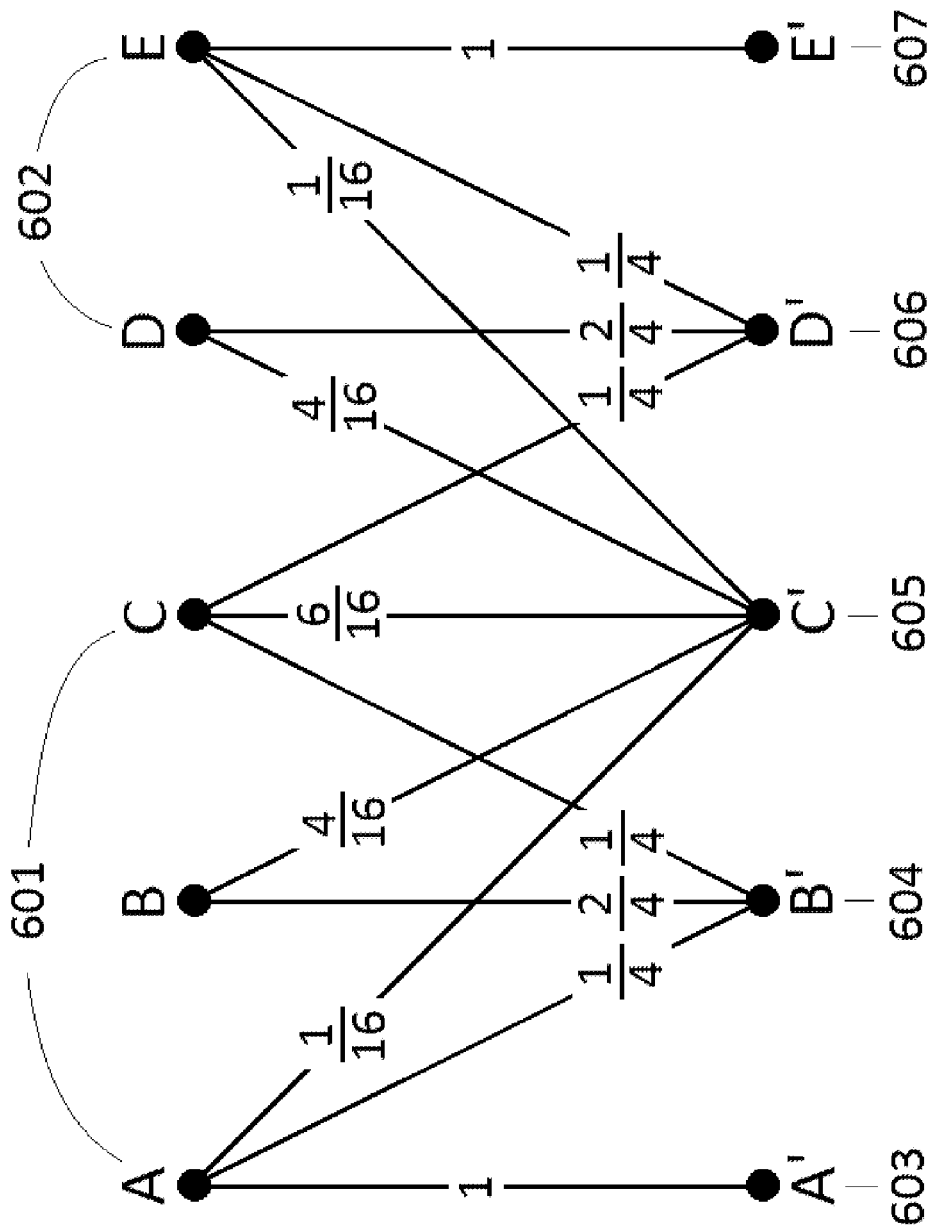
FIG. 6 is the binomial interpolation of timbre vectors according to an exemplary embodiment of the present invention.

FIG. 6 shows the principles of the timbre fusing operation. Original timbre vectors from the first phoneme 601 include timbre vectors A, B, and C. Original timbre vectors from the second phoneme 602 include timbre vectors D and E. The output timbre vectors 603 through 607 are weighed averages from the original timbre vectors. For example, output timbre vector D' is generated from timbre vector C, D, and E using the binomial coefficients 1, 2, and 1; output timbre vector C' is generated from original timbre vectors A, B, C, D, and E using the binomial coefficients 1, 4, 6, 4, and 1. As a very simple case is shown here, the number of timbre vectors involved can be a larger number of $2^n+1$, for example, 9, 17, 33, or 65 for n=3, 4, 5, and 6.

Pitch modification. The state-of-the-art technology for pitch modification of speech signal is the time-domain pitch-synchronized overlap-add (TD-PSOLA) method, which can change pitch from −30% to +50%. Otherwise the output would sound unnatural. Here, pitch can be easily modified by changing the time of separation T, then using timbre interpolation to compensate speed. Natural sounding speech can be produced with pitch modifications as large as three octaves.

Intensity profiling. Because the intensity parameter I is a property of a frame, it can be changed to produce any stress pattern required by prosody input.

Change of speaker identity. First, by rescaling the amplitude spectrum on the frequency axis, the head size can be changed. The voice of an average adult speaker can be changed to that of a baby, a child, a woman, a man, or a giant. Second, by using a filter to alter the spectral envelop, special voice effects can be created.

Figure 7:
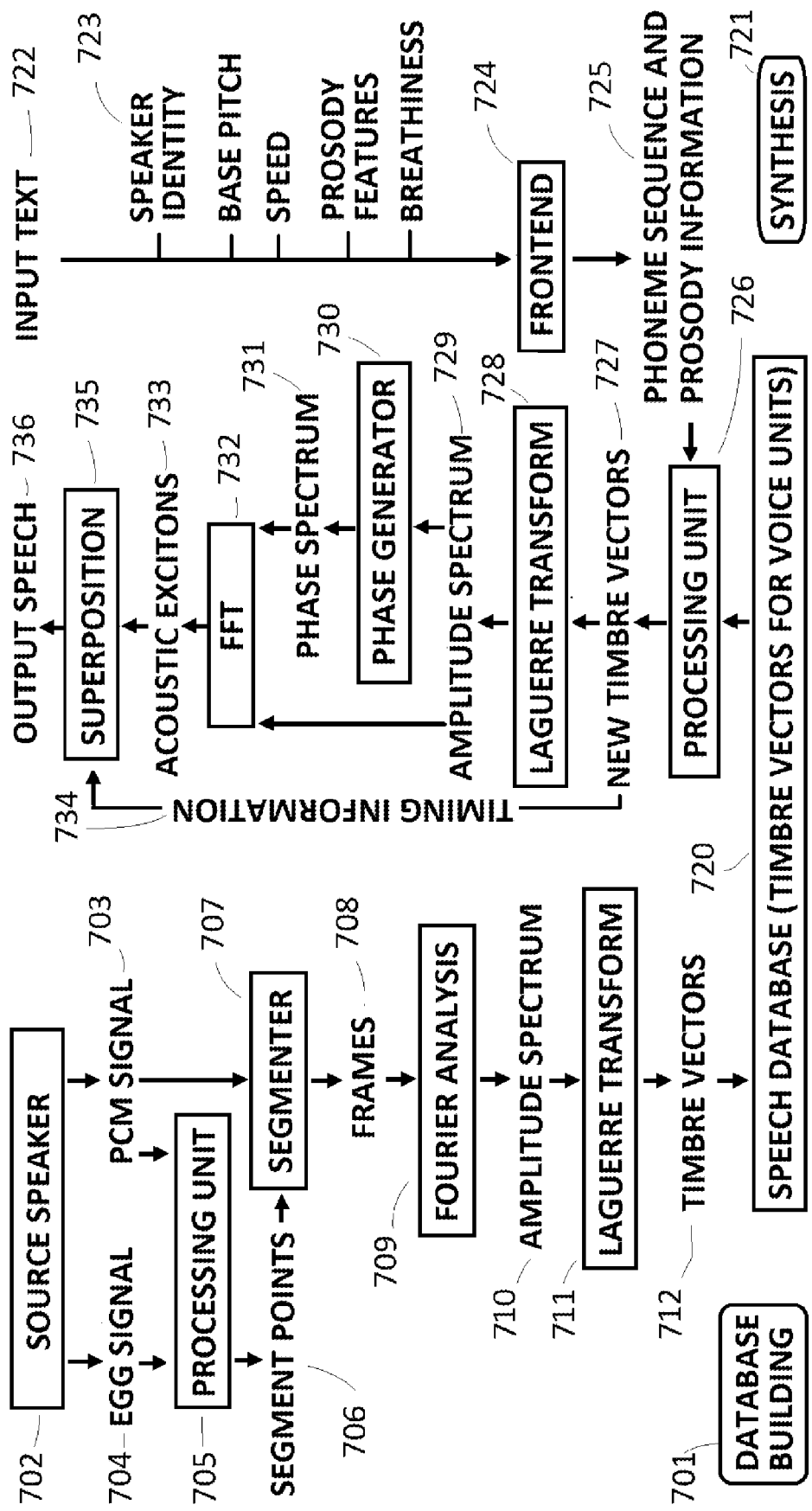
FIG. 7 is a block diagram of a speech synthesis system using timbre vectors according to an exemplary embodiment of the present invention.

Using those voice manipulation capabilities and timbre fusing (see FIG. 6), high-quality speech synthesizers with a compact database can be constructed using the parametric representation based on timbre vectors (see FIG. 7). The speech synthesis system has two major parts: database building part 101 (the left-hand side of FIG. 7), and the synthesis part 121 (right-hand side of FIG. 7).

In the database building unit 701, a source speaker 702 reads a prepared text. The voice is recorded by a microphone to become the PCM signal 703. The glottal closure signal is recorded by an electroglottograph (EGG) to become EGG signal 704. The origin and properties of those signals are shown in FIG. 2. The EGG signal and the PCM signal are used by the processing unit 705 to generate a set of segment points 706. The details of the segmenting process, or the function of the processing unit, is shown in FIG. 3. The PCM signal is segmented by the segmenter 707 into frames 708 using the segment points 706. Each frame is processed by a unit of Fourier analysis 709 to generate amplitude spectrum 710. The amplitude spectrum of each frame is then processed using a Laguerre transform unit 711 to become a unit vector, representing the instantaneous timbre of that frame, to become the basis of timbre vectors 712. The Laguerre functions are shown in FIG. 4. The structure of the timbre vector is shown in FIG. 5. The timbre vectors of various units of speech, such as, for example, phonemes, diphones, demisyllables, syllables, words and even phrases, are then stored in the speech database 720.

In the synthesis unit 721, the input text 722 together with synthesis parameters 723, are fed into the frontend 724. Detailed instructions about the phonemes, intensity and pitch values 725, for generating the desired speech are generated, then input to a processing unit 726. The processing unit 726 selects timbre vectors from the database 720, then converts the selected timbre vectors to a new series of timbre vectors 727 according to the instructions from the process unit 726, and using timbre fusing if necessary (see FIG. 6). Each timbre vector is converted into an amplitude spectrum 729 by Laguerre transform unit 728. The phase spectrum 731 is generated from the amplitude spectrum 729 by phase generator 730 using a Kramers-Kronig relations algorithm. The amplitude spectrum 729 and the phase spectrum 731 are sent to a FFT (Fast Fourier Transform) unit 732, to generate an elementary acoustic wave 733. Those elementary acoustic waves 733 are than superposed by the superposition unit 735 according to the timing information 734 provided by the new timbre vectors 727, to generate the final result, output speech signal 736.

The parametric representation of human voice in terms of timbre vectors can also be used as the basis of automatic speech recognition systems. To date, the most widely used acoustic features, or parametric representation of human speech in automatic speech recognition is the mel-cepstrum. First, the speech signal is segmented into frames of fixed length, typically 20 msec, with a window, typically Hann window or Hamming window, and a shift of 10 msec. Those parametric representations are crude and inaccurate. Features that cross the phoneme borders occur very often.

The parametric representation based on timbre vectors is more accurate. Especially, a well-behaved timbre distance δ between two frames can be defined as $$\delta = \sum_{n=0}^{N} [c_n^{(1)} - c_n^{(2)}]^2,$$

where $c_n^{(1)}$ and $c_n^{(2)}$ are elements of the normalized Laguerre coefficients of the two timbre vectors (see FIG. 5). Experiments have shown that for two timbre vectors of the same phoneme (not diphthong), the distance is less than 0.1. For timbre vectors of different vowels, the distance is 0.1 to 0.6. Furthermore, because of the presence of the voicedness index V (see FIG. 5), vowels and unvoiced consonants are well separated. Because of the intensity parameter I, silence is well separated from real sound. For the recognition of tone languages such as Mandarin, Cantonese, That etc., pitch is an important parameter (see, for example, U.S. Pat. No. 5,751, 905 and U.S. Pat. No. 6,510,410). The frame duration T provides a very accurate measure of pitch (see FIG. 5). Therefore, using parametric representation based on timbre vectors, the accuracy of speech recognition can be greatly improved.

FIG. 8 shows a block diagram of an automatic speech recognition system based on timbre vectors. The first half of the procedure, converting speech signal into timbre vectors, is similar to step 102 through step 114 of FIG. 1 for voice transformation. The voice from a speaker 801 is recorded in the computer as PCM signal 803. The PCM signal 803 is then segmented by segmenter 804 into frames 805, according to segment points 810. There are two methods to generate the segment points. The first one is to use an electroglottograph (EGG) 806 to detect the glottal closure instants (GCI) 807 directly (see FIG. 2). The second one is to use the glottal closure instants detection unit 808, to generate GCI from the voice waveform. The glottal closure instants (GCI) 807 and the voice signal (PCM) 803 are sent to a processing unit 809, to generate a complete set of segment points 810. The details of this process are shown in FIG. 3.

The voice signal in each frame 805 proceeds through a Fourier analysis unit 811 to generate amplitude spectrum 812. The amplitude spectrum 812 proceeds through a Laguerre transform 813 to generate timbre vectors 814.

The timbre vectors 814 are streamed into acoustic decoder 815, to compare with the timbre vectors stored in the acoustic models 816. Possible phoneme sequence 817 is generated. The phoneme sequence is sent to language decoder 818, assisted with language model 819, to find the most probable output text 820. The language decoder 818 may be essentially the same as other automatic speech recognition systems. Because the accuracy of the inventive parametric representation is much higher, the accuracy of the acoustic decoder 815 may be much higher.

For using the speech recognition system in a quiet environment, the PCM signals generated through a microphone can be sufficient. In noisy environments, the addition of an electroglottograph 806 can substantially improve the accuracy.

In ordinary speech recognition systems, adaptation for a given speaker by recording a good number (for example 100) of spoken sentences from a given speaker and processing it can improve the accuracy. Because of the simplicity of the timbre-vector parametric representation, it is possible to use a single recorded sentence from a given speaker to improve the accuracy.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

I claim:

1. A method of voice transformation using one or more processors comprising:
    segmenting the voice-signal into non-overlapping frames, wherein for voiced sections the frames are pitch periods;
    generating amplitude spectra of the said frames using Fourier analysis;
    transforming the said amplitude spectra into timbre vectors using orthogonal functions;
    manipulating the voice parameters of the said timbre vectors to generate a set of new timbre vectors according to the specifications of voice transformation;
    inverse transforming the new timbre vectors into new amplitude spectra using orthogonal functions;
    generating new phase spectra from the new amplitude spectra using Kramers-Kronig relations;
    generating elementary acoustic waves from the new amplitude spectra and the new phase spectra using Fourier transform;
    producing a new voice waveform by superposing the said elementary acoustic waves according to the timing data given by the new timbre vectors.

2. The method of claim 1, wherein segmenting of the voice-signal is based on the glottal closure signals from an electroglottograph and by analyzing the sections of the voice-signal where glottal closure signals do not exist.

3. The method of claim 1, wherein segmenting of the voice-signal is based on analyzing the entirety of the voice-signal by a software comprising the capability of pitch period detection.

4. The method of claim 1, wherein the orthogonal functions are Laguerre functions.

5. The method of claim 1, wherein the voice parameter manipulating comprises executing local duration alternation using timbre interpolation.

6. The method of claim 1, wherein the voice parameter manipulating comprises executing overall speed alternation using timbre interpolation.

7. The method of claim 1, wherein the voice parameter manipulating comprises executing pitch profile alternation by changing the frame duration parameters of the timbre vectors.

8. The method of claim 1, wherein the voice parameter manipulating comprises executing intensity profile alternation by changing the intensity parameters of the timbre vectors.

9. The method of claim 1, wherein the voice parameter manipulating comprises executing speaker identity alternation by changing the head size and the spectral profiles.

10. The method of claim 1, wherein the voice parameter manipulating comprises implementing melody information through the frame duration parameters in the timbre vectors for singing synthesis.

11. A system of voice transformation comprising:
one or more data processing apparatus; and
a computer-readable medium coupled to the one or more data processing apparatus having instructions stored thereon which, when executed by the one or more data processing apparatus, cause the one or more data processing apparatus to perform a method comprising:
segmenting the voice-signal into non-overlapping frames, wherein for voiced sections the frames are pitch periods;
generating amplitude spectra of the said frames using Fourier analysis;
transforming the said amplitude spectra into timbre vectors using orthogonal functions;
manipulating the voice parameters of the said timbre vectors to generate a set of new timbre vectors according to the specifications of voice transformation;
inverse transforming the new timbre vectors into new amplitude spectra using orthogonal functions;
generating new phase spectra from the new amplitude spectra using Kramers-Kronig relations;
generating elementary acoustic waves from the new amplitude spectra and the new phase spectra using Fourier transform;
producing a new voice waveform by superposing the said elementary acoustic waves according to the timing data given by the new timbre vectors.

12. The system of claim 11, wherein segmenting of the voice-signal is based on the glottal closure signals from an electroglottograph and by analyzing the sections of the voice-signal where glottal closure signals do not exist.

13. The system of claim 11, wherein segmenting of the voice-signal is based on analyzing the entirety of the voice-signal by a software comprising the capability of pitch period detection.

14. The system of claim 11, wherein the orthogonal functions are Laguerre functions.

15. The system of claim 11, wherein the voice parameter manipulating comprises executing local duration alternation using timbre interpolation.

16. The system of claim 11, wherein the voice parameter manipulating comprises executing overall speed alternation using timbre interpolation.

17. The system of claim 11, wherein the voice parameter manipulating comprises executing pitch profile alternation by changing the frame duration parameters of the timbre vectors.

18. The system of claim 11, wherein the voice parameter manipulating comprises executing intensity profile alternation by changing the intensity parameters of the timbre vectors.

19. The system of claim 11, wherein the voice parameter manipulating comprises executing speaker identity alternation by changing the head size and the spectral profiles.

20. The system of claim 11, wherein the voice parameter manipulating comprises implementing melody information through the frame duration parameters in the timbre vectors for singing synthesis.

* * * * *